United States Patent Office 3,147,526
Patented Sept. 8, 1964

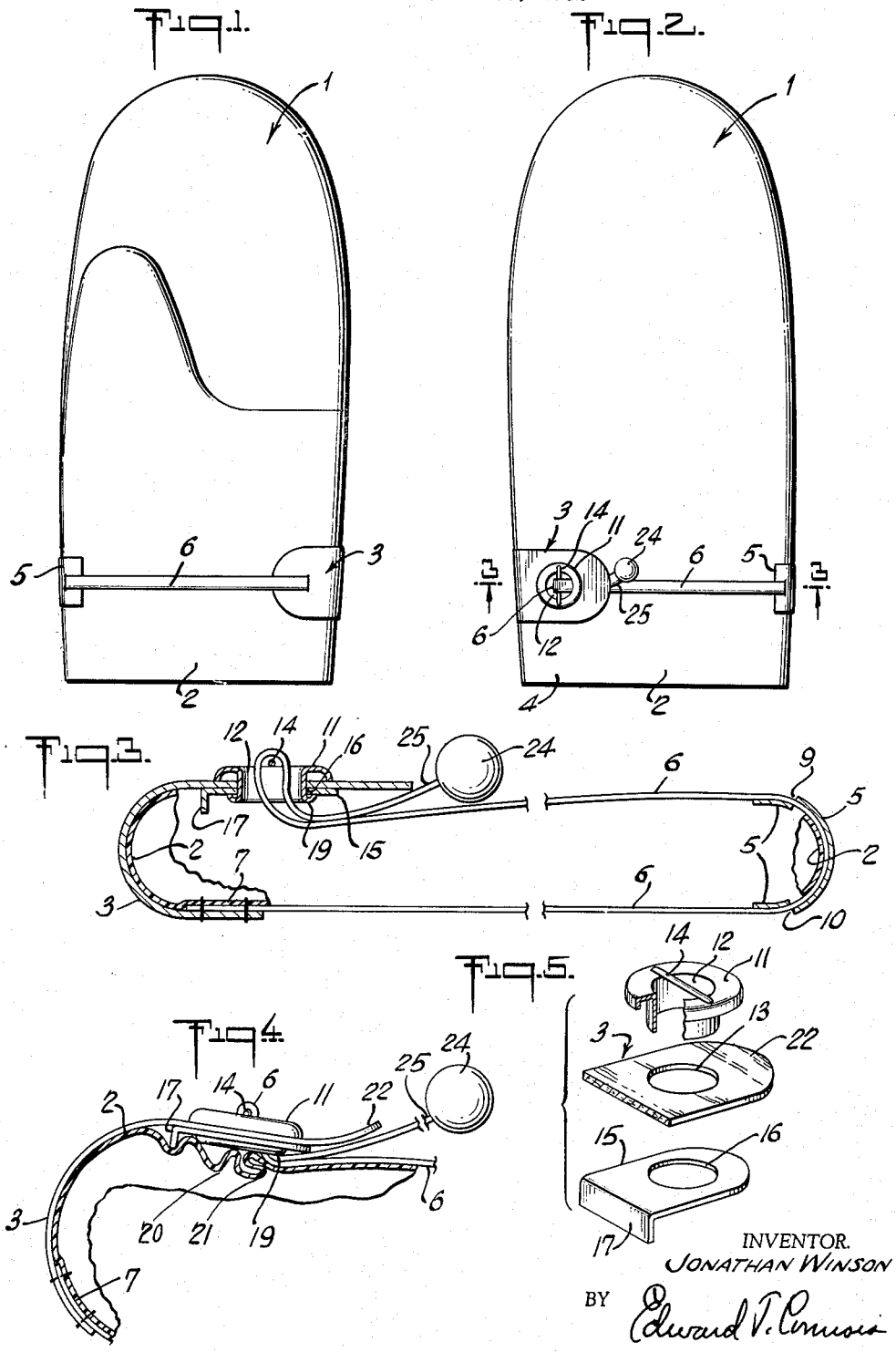

3,147,526
FASTENER ASSEMBLY
Jonathan Winson, 793 East Drive, Oradell, N.J.
Filed Dec. 12, 1962, Ser. No. 244,104
1 Claim. (Cl. 24—117)

The present invention relates to a fastener assembly for the openings of wearing apparel such as the wrist portions of jackets or hand coverings, the legs of pants, the tops of foot coverings, or the collars of jackets. Further, the fastener assembly is suitable for the closure of openings of hand bags, or for any other article in which the opening is closed by gathering material in folds about the opening.

It is important in a fastener assembly that it be easily closed and reopened even by unskilled persons such as children. The fastener assembly taught herein lends itself to low cost construction such as is used in children's mittens and gloves, and is an alternative for snap button or buttoned closures, belt and buckle, or knot tied string closures.

An object of the invention is to provide a fastener assembly which is simple and economical in manufacture, efficient in operation, and rugged in use.

In accordance with the invention a fastener assembly is provided which is closed merely by pulling a cord. The fastener assembly is easily opened by pulling a small tab. The construction utilizes the pressure of gathered material to provide friction to hold the assembly in closed position. A downwardly directed portion of the fastener assembly is responsible for its efficient operation.

Other objects and advantages of the invention will be apparent from the following description and from the accompanying drawing which shows, by way of example, an embodiment of the invention.

In the drawings:

FIGURE 1 is a front view of a mitten incorporating a fastener assembly in accordance with the invention.

FIGURE 2 is a rear view of the mitten shown in FIGURE 1.

FIGURE 3 is a sectional view taken along the line 3—3 of FIGURE 2.

FIGURE 4 is a fragmentary view corresponding to a portion of FIGURE 1 showing the fastener assembly in closed position.

FIGURE 5 is an exploded view of a portion of the fastener assembly.

Referring to the drawings there is shown a mitten 1 including a wrist portion 2 fitted with a fastener assembly in accordance with the invention. While the fastener assembly is shown as positioned about the wrist portion of a mitten, as previously stated, it might also be used for other purposes, for instance, to close the openings at the tops of shoes, to close the sleeves or neck openings of a jacket, or for other similar purposes in which an opening is to be closed by a gathering of the wall of the opening.

The fastener assembly includes an end member 3 adapted to be secured to one side 4 of the wrist portion 2 of the mitten 1. A restraining loop 5 may be attached to the wrist portion 2 approximately opposite the end member 3. However, the restraining loop 5 may be omitted if desired. Any suitable means may be used for attaching the end member and the restraining loop to the mitten as for example these members may be sewn in position. A tape 6 is attached at one end 7 to the end member 3 by being sewn in position between the end member 3 and the surface of the mitten. The restraining loop 5 may be a flat member having openings 9 and 10 through which the tape 6 is passed. The end member 3 is provided with a grommet 11 having an opening 12 therethrough across which is positioned a crosspin 14, the grommet 11 being positioned in an opening 13 in the end member 3. A gathering plate 15 having an opening 16 and a depending portion or outwardly extending leg 17 is held in position on the underside of the end member 3 by the grommet member 11 by outwardly rolled tubular portion 19. It should be noted that the depending portion 17 is positioned on the same side of the grommet 11 as the starting end 7 of the tape 6. The tape 6 is passed upwardly through the opening 12 in the grommet 11 over the crosspin 14 and then back through the opening 12 past end 22 of the end member. A ball or knot 24 may be positioned at end 25 of the tape 6 so as to prevent it from being pulled back through the opening 12.

In using the fastener assembly in accordance with the invention, the ball 24 is pulled to tighten the tape 6 about the tubular wrist portion 2 of the mitten. As the end member is moved towards the right (FIGURE 4) the material of the wrist portion 2 naturally will form gathered portions. The depending portion 17 of the plate 15 restrains these gathered portions from becoming randomly positioned and forces the gathered portions to form one or two gathered loops 20 immediately under the grommet 11. As the tape 6 is pulled the gathered material is pressed against the underside of the tape 6 immediately under and after it has passed the crosspin 14 as indicated at 21. The resulting pressure of the gathered material causes sufficient friction so that the tape 6 is maintained in set position and the wrist opening is closed comfortably about the wrist of the wearer.

A feature of the invention is the construction whereby the tape 6 completely encircles the wrist portion 2. It will be noted that the tape 6 is attached at its end 7 to the end member 3, while its other end is secured by the crosspin 14. Because the tape 6 is attached at both ends to the end member 3, there is a continuous band of material to hold the opening closed. Thus all of the closing force is carried by the tape 6 and not transmitted to the outer covering of the mitten. The only stress transmitted to the covering of the mitten is that to overcome the starting friction while the tape 6 is pulled into closing position and when the end or tab 22 of the end member 3 is lifted or pulled to release the fastening assembly. Thus the fastener is suitable for articles in which the surface is relatively weak, as is the case in which plastic materials are pierced by sewing.

In some constructions the tape 6 need not be attached to the end member 3 but may be attached to the material of the wall of the opening at any point along its circumference. In such a construction, in the closing operation, the material is then gathered between the point of attachment of the end member 3 and the point of attachment of the end of the tape.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claim.

I claim:

A fastener assembly for an article having an opening adapted to be closed by gathering the material about the opening in folds, comprising an end member, a tape having a fixed end secured to the end member, a grommet in the end member, a cross pin extending across the opening of the grommet, a flat apertured member attached to the end member by the grommet, and a downwardly depending leg from the flat member directed towards the material to be gathered, the tape adapted to encircle the article and having a free end and said free end looped over the cross pin, said free end forming a closing member adapted to be pulled, said depending leg offset from said crossbar and positioned on the same side of the grommet as the fixed end of the tape between the fixed end of the tape and the grommet and outwardly of the opening in the grommet, whereby when the free end of the tape is pulled the leg gathers material, the material forcing the tape against the grommet thus providing friction holding the tape in a desired position.

References Cited in the file of this patent

UNITED STATES PATENTS

| | | |
|---|---|---|
| 294,909 | Porter | Mar. 11, 1884 |
| 2,085,467 | Lipton | June 29, 1937 |
| 2,508,031 | Kennedy | May 16, 1950 |
| 2,590,015 | Kennedy | Mar. 18, 1952 |